P. M. ELLIOTT.
CAR DOOR.
APPLICATION FILED OCT. 14, 1912.
1,071,514.
Patented Aug. 26, 1913.
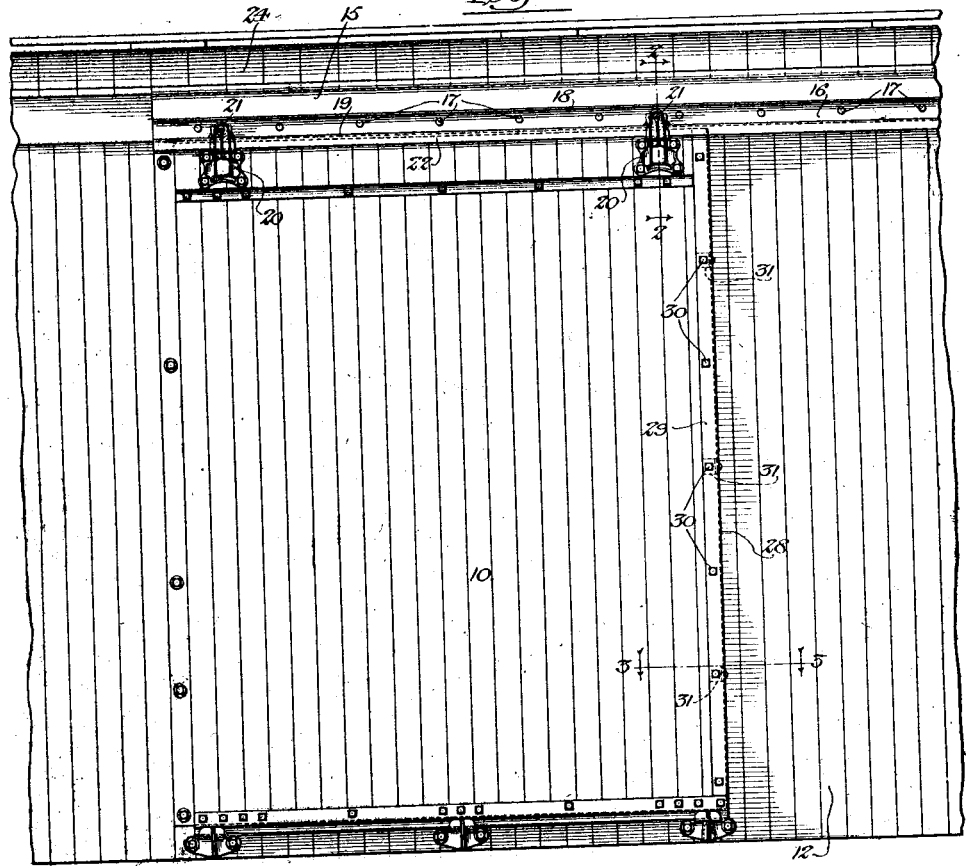

UNITED STATES PATENT OFFICE.

PERCY M. ELLIOTT, OF CHICAGO, ILLINOIS, ASSIGNOR TO CAMEL COMPANY, OF CHICAGO, ILLINOIS, A CORPORATION OF MAINE.

CAR-DOOR.

1,071,514.　　　　　Specification of Letters Patent.　　Patented Aug. 26, 1913.

Application filed October 14, 1912. Serial No. 725,738.

*To all whom it may concern:*

Be it known that I, PERCY M. ELLIOTT, a citizen of the United States, and a resident of Chicago, county of Cook, and State of Illinois, have invented certain new and useful Improvements in Car-Doors, of which the following is a full, clear, and exact description.

The invention relates to sliding doors for railway cars and seeks to provide an improved track bar and an improved guard for the rear edge of the door whereby access of rain through the door opening of the car is effectively prevented when the door is closed.

The invention consists in the features of improvement hereinafter set forth, illustrated in the accompanying drawings and more particularly pointed out in the appended claims.

In the drawings, Figure 1 is a side elevation of the car body and door. Figs. 2 and 3 are enlarged detail views on the lines 2—2 and 3—3 respectively of Fig. 1.

The car body is provided with an opening which is closed by a sliding door 10. The door posts 11, as shown in Fig. 3, are provided with portions which project outwardly through the door opening and project beyond the outer face of the car formed by the siding 12. As usual, a header 13 for the door opening extends between the upper ends of the door posts and beneath the car plate 14. A track block 15 and a track bar 16 are secured to the side of the car above the door opening by a series of bolts 17. The track block 15 abuts against the side 12 of the car and its outer lower portion is recessed or cut away to receive the track bar 16. The latter is a channel-bar of wrought iron or steel and is provided with upper and lower track flanges 18 and 19 which project outwardly from the upper and lower edges of its web or main body portion. The web or main body portion abuts against the lower portion of the outer face of the track block and the bolts 17 extend through the track bar slightly above its center. These bolts extend from the track bar through the block 15, siding 12 and through the car plate 14, the construction being such that the track bar is securely held in position to resist the strains brought upon it by the sliding door.

The door is provided at its upper edge with a pair of hanger brackets 20, the upper, inwardly offset portions of which carry rollers 21 arranged between the upper and lower track flanges 18 and 19 of the track bar. The rollers 21, normally engage the lower track flange 19, but if the door is raised in shifting it, the rollers engage the upper track flange and prevent any rubbing or friction. The outer portion of the track block and the lower track flange extend over the upper edge of the door and the track flange is preferably provided at its outer edge with a downwardly extending portion 22 which overlaps the upper edge portion of the door to thereby hold the door in position and the rollers of the door hangers in engagement with the track bar. Preferably, as shown, the hangers 20 are provided with integral portions 23 extending upwardly behind the depending portion or strip 22.

The upper face of the upper track flange 18 is downwardly and outwardly inclined to a slight extent, as shown in Fig. 2. The track block 15 is cut away or recessed to snugly fit the inner face of the web or main body portions of the track bar and to fit partially over the inclined upper face of the track flange 18. Preferably, as shown, the outer face of the portion of the track block which extends over the upper track flange is outwardly and downwardly inclined and preferably, also, the track block extends upwardly so that its upper end is flush with the face of the roofing boards 24. The arrangement is such that rain and water are deflected outwardly by the inclined faces of the track block and track flange 18 and will not pass between the track block and track bar into the door opening.

The rear edge of the door opening is provided with a guard strip 25 which is preferably in the form of an angle bar. One flange of this angle bar abuts against the rear face of the projecting portion of the rear door post and is secured thereto by screws 26. This portion, as shown in Fig. 3, of the guard strip is snugly arranged between the adjacent side board 12 and the outwardly projecting portion of the door post. The other portion or flange of the angle bar extends rearwardly flush with the outer face of the door post and at its rear edge is provided with a reverted, inclined flange 27 which extends inwardly and forwardly, as shown. This flange 27 is spaced from the side of the car and also from the adjacent faces of the guard strip 25.

The door is provided at its rear edge with a channel bar 28. The channel-bar has a relatively wide outer flange 30 which abuts against the outer face of the door and is secured thereto by a series of bolts 29. At intervals a series of angle pieces 31 are riveted to the channel-bar 28 and portions of these angle pieces 31 abut against or are recessed into the inner face of the door, as most clearly shown in Fig. 3. The bolts 30 are preferably provided with flat headed inner ends and certain of these bolts extend through the inner portions of the angle pieces 31. After the nuts are threaded on the bolts, the outer ends thereof outside of the nuts are upset. The channel-bar 28 is provided with a relatively narrow, inner flange 32 which is spaced from the inner face of the door and which is inwardly and forwardly inclined in accordance to the incline of the flange 27. As the door is closed, the inclined flange 32 engages the inclined flange 27 and draws the rear edge of the door snugly to closed position. Furthermore, the rearwardly extending portion of the guard strip 25 is resilient so that the flanges 27 and 32 can snugly engage one another to prevent the access of rain and moisture through the rear edge of the door. When the car is traveling in the direction in which the door opens, the rain beating into the space between the side of the car and these flanges cannot work between them, but will collect in the channel or space 33 formed between the flange 27 and the main body of the angle bar 25 and will run down and escape from the lower end of this channel. The channel-bar guards the rear edge of the door against blows and prevents the entrance of unauthorized persons through this portion of the door. Furthermore, the construction is such that it acts very effectively to prevent the entrance of rain and water through the rear edge of the door.

It is obvious that changes may be made in the details set forth without the departure from the essentials of the invention as defined in the claims.

I claim as my invention:—

1. The combination with a car body having a door opening provided with posts projecting outwardly beyond the outer side face of the car and with a sliding door for closing said opening, of a guard strip secured to and projecting from the rear door post and having a rearwardly extending part provided with a reverted, inclined flange extending inwardly and forwardly from its rear edge, said flange being spaced away from the side of the car, and a bar overlapping the rear edge of said door and projecting inwardly beyond the face of the door, said bar being provided with a forwardly turned and inclined flange to enter the space between the side wall of the car body and the guard strip and engage the inner face of the reverted flange of said guard strip to form a tight joint therewith.

2. The combination with a car body having a door opening, and a sliding door for closing said opening, of a guard strip secured to and projecting rearwardly from the rear door post and spaced from the side of the car, a channel-bar on the rear edge of the door having a relatively wide, outer flange abutting against the outer face of the door and a relatively narrow, inner flange arranged to overlap said guard strip, angle pieces secured to said channel-bar and abutting against the inner face of the door, and fastening bolts extending through said outer flange, and said angle pieces and through the rear edge portion of the door, substantially as described.

3. The combination with a car body having a door opening provided with posts projecting outwardly beyond the outer face of the car with a sliding door for closing said opening, of a vertical guard strip secured to the rear door post and projecting rearwardly therefrom in the plane of the outer face of said post, a rearwardly projecting portion of said guard strip being V-shaped in section and comprising a reverted, inclined flange extending inwardly and forwardly from its rear edge, said flange being spaced from the side of the car, and a channel bar overlapping the rear edge of said door, said channel bar having a relatively wide outer flange abutting against and bolted to the outer face of the door and a relatively narrow, inwardly and forwardly inclined, inner flange arranged to abut against the forwardly and inwardly inclined flange of said guard strip, substantially as described.

4. The combination with a car body having a door opening provided with posts projecting outwardly beyond the outer face of the car and with a sliding door for closing said opening, of a vertical guard strip secured to the rear door post and projecting rearwardly therefrom in the plane of the outer face of said post, the rearwardly projecting portion of said guard strip being V-shaped in section and comprising a reverted, inclined flange extending inwardly and forwardly from its rear edge, said flange being spaced away from the side of the car and from the rear face of said door post to thereby form a vertical channel between it and the outer portion of said guard strip for the escape of collected moisture, and a bar secured to the rear edge of said door and having a forwardly turned and inclined flange adapted to enter the space between the side wall of the car body and the guard strip and engage the inner face of the reverted flange of said guard strip to form a tight joint therewith, substantially as described.

PERCY M. ELLIOTT.

Witnesses:
 HARRY L. CLAPP,
 KATHARINE GERLACH.